(12) United States Patent
Dockery et al.

(10) Patent No.: US 8,419,176 B2
(45) Date of Patent: Apr. 16, 2013

(54) AQUEOUS COMPOSITIONS WITH IMPROVED SILICON CORROSION CHARACTERISTICS

(75) Inventors: Kevin P. Dockery, Rochester, NY (US); Allan F. Sowinski, Rochester, NY (US); Barbara B. Lussier, Rochester, NY (US); Mihaela L. Madaras, Webster, NY (US); Kurt D. Sieber, Rochester, NY (US); Hwei-Ling Yau, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 576 days.

(21) Appl. No.: 12/474,770

(22) Filed: May 29, 2009

(65) Prior Publication Data

US 2010/0302292 A1 Dec. 2, 2010

(51) Int. Cl.
*C09D 11/00* (2006.01)

(52) U.S. Cl.
USPC .......................................................... 347/100

(58) Field of Classification Search .................... 347/100
See application file for complete search history.

(56) References Cited

U.S. PATENT DOCUMENTS

| | | | |
|---|---|---|---|
| 3,761,953 A | 9/1973 | Helgeson et al. | |
| 4,734,711 A | 3/1988 | Piatt et al. | |
| 5,394,177 A | 2/1995 | McCann et al. | |
| 6,267,806 B1 | 7/2001 | Lavery et al. | |
| 6,551,390 B1 * | 4/2003 | Lavery et al. | 106/31.48 |
| 6,588,888 B2 | 7/2003 | Jeanmaire et al. | |
| 6,943,037 B2 | 9/2005 | Anagnostopoulos et al. | |
| 7,160,377 B2 | 1/2007 | Zoch et al. | |
| 7,370,952 B2 | 5/2008 | Inoue et al. | |
| 2003/0007039 A1* | 1/2003 | Lebens et al. | 347/77 |
| 2003/0024434 A1* | 2/2003 | Butler et al. | 106/31.28 |
| 2003/0048333 A1* | 3/2003 | Rapp et al. | 347/65 |
| 2003/0226221 A1* | 12/2003 | Mikoshiba et al. | 8/662 |
| 2004/0061755 A1* | 4/2004 | Chen et al. | 347/100 |
| 2005/0007433 A1 | 1/2005 | Inoue et al. | |
| 2007/0176992 A1* | 8/2007 | Arai et al. | 347/100 |
| 2009/0065478 A1 | 3/2009 | Dockery et al. | |

FOREIGN PATENT DOCUMENTS

| | | |
|---|---|---|
| EP | 1 013 450 | 7/2006 |
| GB | 2 332 439 A | 6/1999 |
| JP | 61 002776 A | 1/1986 |
| JP | 62 236874 A | 10/1987 |
| JP | 11 140359 A | 5/1999 |
| WO | WO 98/44053 A1 | 10/1998 |
| WO | WO 00/20513 A1 | 4/2000 |
| WO | WO 2004/011560 A2 | 2/2004 |
| WO | WO 2004/046256 A1 | 6/2004 |

OTHER PUBLICATIONS

Don L. Kendall, Robert A. Shoultz, "Wet Chemical Etching of Silicon and SiO2, and Ten Challenges for Micromachiners," SPIE Handbook of Microfabrication, Micromachining, and Microlithography, vol. 2, SPIE Optical Press, pp. 41-97, Ed. P. Rai-Choudhury.

Carsten Christensen, Roger de Reus, and Siebe Bouwstra, "Tantalum Oxide Thin Films as Protective Coatings for Sensors," Journal of Micromech. Microeng., vol. 9, 1999, pp. 113-118.

Gert F. Eriksen and Karsten Dyrbye, "Protective Coatings in Harsh Environments," J. Micromech. Microeng. (1996), vol. 6, pp. 55-57.

* cited by examiner

*Primary Examiner* — Laura Martin
(74) *Attorney, Agent, or Firm* — Andrew J. Anderson

(57) ABSTRACT

A process for printing inkjet ink and other aqueous compositions through silicon-based microelectromechanical printer structures is disclosed that suppresses the normal dissolution of the silicon device components in contact with the aqueous composition. Inkjet ink and other aqueous compositions used in the process contain the soluble salts of organic aromatic azo compounds in sufficient concentrations to inhibit silicon corrosion. The useful lifetime of microelectromechanical fluidic devices based on silicon fabrication is extended.

14 Claims, No Drawings

AQUEOUS COMPOSITIONS WITH IMPROVED SILICON CORROSION CHARACTERISTICS

FIELD OF THE INVENTION

The present invention is related to a process for printing an aqueous ink jet ink composition, and aqueous compositions useful in inkjet printers. In particular, the invention is directed towards such process wherein the ink or other aqueous composition employed comprises the soluble salts of organic aromatic azo compounds that minimize the corrosion of silicon-based material comprising useful microelectromechanical devices in contact with the ink. The ink composition is particularly useful for extending printing device lifetimes in continuous ink jet printing applications.

BACKGROUND OF THE INVENTION

Silicon-based materials, where silicon is the primary material of construction, are employed in numerous integrated circuits (IC) and microelectromechanical systems (MEMS) devices. However, it has long been known that in aqueous chemical environments, where silicon-based sensors and actuators may be used, that corrosion (etching) of the silicon-based materials can cause premature device wear and failure. In fact, there are many commonly used processes for machining silicon that rely on wet corrosion (etching) of silicon; see for example Kendall, D. L.; Shoultz, R. A. "Wet Chemical Etching of Silicon and $SiO_2$, and Ten Challenges for Micromachiners", *SPIE Handbook of Microfabrication, Micromachining, and Microlithography*, Vol. 2, SPIE Optical Press, pp. 41-97, 1997. Ed. P. Rai-Choudhury. Recently, MEMS technology has been applied to fluid management systems. An example of a microfluidic fluid management system that incorporates silicon-based MEMS devices is continuous ink jet (CIJ) printing.

Continuous ink jet (CIJ) printers typically consist of two main components; a fluid system and a printhead, or multiple printheads. Ink is pumped through a supply line from a supply reservoir to a manifold that distributes the ink to a plurality of orifices, typically arranged in linear array(s), under sufficient pressure to cause ink streams to issue from the orifices of the print head. Stimulations are applied to the printhead to cause those ink streams to form streams of uniformly sized and spaced droplets, which are deflected into printing or non-printing paths. The non-printing droplets are returned to the supply reservoir via a droplet catcher and a return line. U.S. Pat. Nos. 3,761,953 A, 4,734,711 and 5,394,177 and EP 1,013,450 describe in detail the design of a fluid system for CIJ apparatus. The more recent development of a silicon-based MEMS CIJ printhead fabrication and printing apparatus can be found in U.S. Pat. No. 6,588,888 and U.S. Pat. No. 6,943,037, the disclosures of which are herein incorporated by reference. The design of the nozzle plate (printhead die) used in the drop generator of the printing system is one of the distinguishing elements of MEMS CIJ technology. A single crystal silicon die may be used as the substrate for the nozzle plate and, complementary metal oxide semiconductor (CMOS) electronics are included as part of the device. The surface nozzle structures and associated on-board CMOS electronics are fabricated using the same manufacturing technologies and material sets employed for the construction of silicon integrated circuits. The printhead die also incorporates fluid channels running through the silicon. During drop generation, heaters in the device transfer thermal energy to the fluid jetting through each nozzle.

As noted in the discussion above, the CIJ printhead is comprised of several components. A more detailed discussion of the printhead and its operation is provided herein with particular emphasis on silicon and its interactions with fluids, given that silicon-fluid interactions are particularly relevant to the present invention. These components include a manifold for interfacing with the fluid system and accepting ink or other fluids supplied by the fluid system to allow transport of these fluids to other components of the printhead; an electrical interconnect system means for interfacing with the electrical signals supplied by an external writing system that supplies the printhead with the information pertaining to the drop-wise formation of a printed image on a support, where the support is stationary or non-stationary, from ink-containing drops generated by the printhead; and a drop-generating component, whose function is to provide a means for generating drops from ink or other fluids delivered to the drop generating component from the manifold. The drop-generating component providing a means for generating drops in a silicon-based CIJ printing system employs silicon-based devices fabricated using the same technology employed for fabricating silicon integrated circuits. The silicon-based devices may contain multiple fluid channels as well as a plurality of small orifices, also called nozzles, which enable ink or other fluids supplied by the fluid system to pass from the manifold to the support through the formation of one or more columns of fluid also called fluid jets, which exit the silicon-based device when appropriate pressures are employed. The fluid column(s) or fluid jet(s) transform into well-defined drops under appropriate conditions. The pressures employed in silicon-based CIJ printing system are generally above 69 kPa and less than 1380 kPa. The materials of construction of the silicon-based devices in a silicon-based MEMS CIJ printhead may be quite varied and the materials of construction that contact ink or other fluids supplied by the fluid system or manifold are of particular interest to the present invention.

Silicon-based devices used as components that provide a means for generating drops from a fluid are generally fabricated using substrates prepared from single crystal silicon. The use of large grain polycrystalline silicon substrates for device fabrication is known in the art. The substrates may have varying thicknesses, from 50 microns to greater than 1 mm, and the substrate surface may have any crystallographic orientation that is suitable for the device application. For example, the silicon substrate may be prepared with an orientation defined by Miller indices of <100>, <111>, <110>. The use of various crystallographic orientations in device substrates is well known to those familiar with the art of semiconductor device fabrication. The singe crystal silicon substrate may have varying electrical properties. For example, the electrical properties of the single crystal silicon can be varied by the incorporation of small amounts of foreign impurities, also called dopants or carriers. These foreign impurities, such as, for example, boron or phosphorus, determine whether the electrical charge of the majority carrier type in the silicon crystal is negative or positive. Such modified substrates are known as n-type and p-type silicon, respectively The use of both p and n-type silicon substrates for fabrication of silicon-based devices is known in the art. The use of silicon substrates of low resistivity, where the resistivity is less than 100 ohm-cm, and the use of silicon substrate of high resistivity where the resistivity is greater than 1000 ohm-cm, irrespective of carrier type and substrate crystallographic orientation, is known in the art of semiconductor device fabrication.

The additional preparation of substrates by deposition of layers of silicon, either polycrystalline or amorphous by various means as well as deposition of silicon by various means on insulating layers prepared by various means, such as, for example, polysilicon deposited on silicon dioxide insulators formed by thermal oxidation of the silicon substrate, also known as silicon on insulator or SOI, is known in the art. The resulting deposited silicon containing layer(s) may be either doped or undoped, p-type or n-type, and additionally may be either polycrystalline, meaning that the arrangement of silicon atoms in three dimensional space within the layer are identical with those found in single crystal silicon, or amorphous or poorly crystalline, meaning that that the arrangement of silicon atoms in three dimensional space within the layer deviates relative to those found in single crystal silicon and shows varying degrees of disorder relative to those atomic positions found in single crystal silicon. Device performance has been shown to improve after substrate surface quality has been controlled by the use of additional layer deposition, and this observation is familiar to those knowledgeable in the art of semiconductor device fabrication.

The use of subsequently deposited layers optionally containing silicon is known in the art of semiconductor device fabrication. Deposited layers optionally containing silicon can be prepared by any method known in the art of semiconductor device fabrication including chemical vapor deposition with the optional use of plasma assistance or enhancement at low (<400° C.) and high temperatures (>400° C.) under both low pressure (<1 torr) and high pressure (>1 torr) conditions. Deposited layers optionally containing silicon can be prepared by vapor deposition by physical vapor deposition (evaporation) optionally plasma assisted or enhanced, as well as by epitaxial growth methods. The resulting optionally silicon containing layers may be electrically insulating or electrically conductive to varying degrees, either doped or undoped, p-type or n-type, and additionally may be either polycrystalline, meaning that the arrangement of atoms in three dimensional space within the layer are identical with those found in single crystals of the same elemental composition, or amorphous or poorly crystalline, meaning that that the arrangement of atoms in three dimensional space within the layer deviates relative to those found in single crystal of the same composition and shows varying degrees of disorder relative to those atomic positions found in single crystal silicon. It is known in the art that silicon containing deposited layers may contain additional foreign atoms of varying amounts including, for example, some of the aforementioned dopants boron and phosphorus to control electrical properties, and additional atoms, interstitial or otherwise, resulting from the deposition process or a combination thereof Examples of dopants include boron, phosphorus, arsenic, nitrogen, carbon, germanium, aluminum, and gallium. Examples of interstitial or non-interstitial foreign atoms include hydrogen, oxygen, nitrogen, carbon, select atoms from elements listed from group VI B of the periodic table (O, S, Se, Te) and select atoms of elements listed in the group VII B of the periodic table (F, Cl, Br, I). Hydrogen, oxygen, nitrogen, and carbon are commonly present with silicon in devices and devices containing microelectromechanical systems and each of the elements oxygen, nitrogen and carbon are often found combined with silicon in the form of stoichiometric or non-stoichiometric binary, ternary, and quaternary compounds like silicon hydrides of varying compositions, silicon oxides of varying compositions and hydration including silicon suboxides and hydrated silicon oxides and suboxides, silicon nitrides of varying compositions, silicon oxynitrides of varying compositions, silicon carbides of varying compositions, and silicon oxycarbides of varying compositions. These binary and ternary silicon containing compounds can be either discrete layers in the device or part of the surface composition of silicon, polysilicon, and amorphous silicon. Additionally, other elements such as Al, Ti, Ta, W, Zr, Hf, and Cu are often found with silicon and/or silicon containing binary compounds such as silicon oxides and silicon carbides, in devices and are sometimes observed as intermetallic alloys with silicon. Examples of intermetallic silicon containing alloys are titanium containing silicides of all compositions, tantalum containing silicides of all compositions, tungsten containing silicides of all compositions, zirconium containing silicides of all compositions, halfnium containing silicides of all compositions, copper containing silicides of all compositions, as well as ternary aluminum silicon oxides, ternary halfnium silicon oxides, ternary zirconium silicon oxides. Those knowledgeable in the art of semiconductor device fabrication are familiar with the different alloys, binary compounds, ternary and quaternary compounds that can form during processing and this is considered common knowledge in the art.

When a continuous inkjet printing system is in operation, fluid is essentially always flowing through the nozzles of the drop generator. There may be startup fluids passing through the printer for cleaning the fluid delivery system before printing with inks. Inks may remain in the printing system for extended times during a given printing run because the run duration may vary from hours to weeks. Flushing fluids may be used during ink changeovers or as part of routine maintenance. When the system is printing, only a small portion of the ink passing through the drop generator actually prints on the substrate. Most of the ink is collected and returned to the fluid delivery system for reuse. Finally, shut down fluids and storage fluids may be used to clean out inks from the fluid delivery system and the printhead, and ensure that the system does not fail during startup after storage.

It is desirable to have a printhead operate reliably for many hundreds to thousands of hours. The fluid volume passing through a CIJ print head is large; accordingly, over a desired printhead lifetime, many thousands of liters of solution can pass through the printhead die. Therefore there is extensive exposure of the silicon-based nozzle plate to fluids in CIJ systems. Any degradation of the silicon-based materials in these solutions, as by corrosion (or etching, or dissolution), represents a great concern.

There is a substantial pressure gradient across the continuous ink jet printhead nozzle plate during operation that can be 100's of kPa, putting the fragile device under great stress. Corrosion of the silicon-based substrate can lead to complete rupture of the printhead die itself, or minimally to increases in the size of the channels and orifices through which the ink flows, creating drop ejection defects such as permanently crooked jets or erroneous drop sizes. Extensive corrosion of the backside of the device can alter the thermal mass of the backside die and compromise heat management within the device leading to additional potential problems around drop formation from the jets. Clearly, corrosion of silicon-based materials needs to be prevented or minimized in silicon-based MEMS CIJ printing and in other applications where silicon is exposed to solutions that may corrode the silicon. An approach to addressing the problem of silicon-based device corrosion is to apply passivation coatings to the device. Passivation coatings are protective coatings that typically exhibit relatively low rates of etching. Silicon itself is known to readily form native silicon oxide coatings; however, these thin native silicon oxide coatings (ca. 1 nm) are also subject to corrosion processes and can be insufficient to protect the silicon metal. Examples of passivation coatings include thermally produced silicon oxides, various silicon nitrides, and tantalum oxide (G. F. Eriksen and K. Dyrbye, "Protective Coatings in Harsh Environments," J. Micromech. Microeng. (1996), vol. 6, 55-57; C. Christensen et al., "Tantalum Oxide Thin Films as Protective Coatings for Sensors," J. Micromech. Microeng. (1999), vol. 9, 113-118.) However, the passivation approach is problematic because it requires the introduction of additional coating steps to the process, the coatings can introduce undesirable effects in the device such as stress, and coating defects like pinholes can compromise the effectiveness of the passivation coating. Moreover, many coating methods may not be practical for microfluidic devices, because the areas to be coated, such as fluid channels, are internal to the device or because the coating methods require conditions, such as a temperatures, which are not compatible with the device. Another general approach to improving ink performance with regard to silicon corrosion is through adjustment of the ink pH value through the use of appropriate buffer solutions. For example, Inoue et al. in U.S. Pat. No. 7,370,952 B2 note that buffers can be used to adjust the pH values of inks used in drop-on-demand inkjet printers to reduce the effects of corrosion. This is primarily because the corrosion of silicon is known to be accelerated by higher pH value (more alkaline) solutions, such as those used in wet etching processes. At the same time, compositions useful to inkjet inks often require some alkalinity in order to maintain solution integrity, e.g., in order to prevent precipitation of ink components. However, for technologies such as CIJ, even reduced etch rates, i.e., in the sub 100 nm/h range, can prematurely degrade system performance after just tens to hundreds of hours of operation, even resulting in catastrophic device failure. The direct measurement of silicon corrosion rates, also referred to as etch rates, has been disclosed by Dockery et al. in U.S. Pat. App. Pub. No. 2009/0065478 A1, the disclosure of which is incorporated herein by reference.

The use of organic naphthalenic azo compounds for use as stabilizers in the preparation of colloidal gas black suspensions, also known as pigment dispersions, for subsequent use in the production of inks, inkjet inks, surface coatings, and colored printing inks, is taught by Zoch et al. in U.S. Pat. No. 7,160,377 B2. Such reference does not teach their use as silicon corrosion inhibitors added to pigments predispersed without such azo compounds, and it does not teach their use with other pigments or in essentially pigment-free solutions. Furthermore, such reference is limited to naphthalenic azo compounds, and it is inconvenient because the azo compounds are added to the pigment dispersion prior to ink formulation.

SUMMARY OF THE INVENTION

The need for increased microelectromechanical silicon printhead durability when jetting aqueous fluids is provided by a process for printing an aqueous ink composition with an ink jet printer comprising a silicon-based material which contacts the ink composition, comprising loading the printer with an aqueous ink composition and ejecting the ink composition against a recording material, wherein the ink composition comprises at least a first colorant and a soluble organic aromatic azo compound in a concentration sufficient to inhibit corrosion of the silicon-based material when contacted by the ink composition.

Further provided is a process comprising loading an ink jet printer comprising a silicon-based material with an aqueous composition and contacting the silicon-based material of the printer with the aqueous composition, wherein the aqueous composition comprises a soluble organic aromatic azo compound in a concentration sufficient to inhibit corrosion of the silicon-based material when contacted by the aqueous composition, and wherein the aqueous composition comprises less than 2 weight percent of any colorants.

Also provided is an aqueous ink composition for use in an inkjet printer comprising a silicon-based material which contacts the aqueous ink composition, comprising at least a first colorant and a soluble organic aromatic azo compound in a concentration sufficient to inhibit corrosion of the silicon-based material when contacted by the aqueous composition, wherein the soluble organic azo compound concentration is from about 0.001 to less than 1.0 weight percent.

Further provided is an aqueous composition for use in an inkjet printer comprising a silicon-based material which contacts the aqueous composition, comprising a soluble organic aromatic azo compound in a concentration sufficient to inhibit corrosion of the silicon-based material when contacted by the aqueous composition, wherein the aqueous composition comprises less than 2 weight percent of any colorants.

ADVANTAGEOUS EFFECT OF THE INVENTION

The invention provides numerous advantages. It has been found most unexpectedly that formulation of ink jet ink and other aqueous compositions with solubilized organic aromatic azo compounds provides significant improvements by minimizing the corrosion of silicon-based materials in contact with the ink and other compositions. The invention provides a process for printing ink jet compositions through silicon-based printheads, and for printing with other improved aqueous fluids that suppress the natural dissolution of the silicon device components in water. The robust performance and useful lifetime of silicon-based microelectromechanical fluidic devices is extended.

DETAILED DESCRIPTION OF THE INVENTION

In one embodiment of the invention, an aqueous inkjet composition is comprised of at least one primary colorant and an azo compound of the type disclosed in the present invention. In another embodiment of the invention, the aqueous composition is comprised of a non-imaging aqueous fluid, such as a relatively clear protective overcoat fluid or a cleaning fluid or a maintenance fluid, and an azo compound of the type disclosed in the present invention is present at levels that suppress silicon corrosion but do not provide useful colorant strength for an ink jet ink printing. The present invention is especially useful for the formulation of minimally silicon corrosive ink jet imaging inks and other fluids, especially for use in CIJ.

The soluble organic aromatic azo compounds employed in accordance with the invention may be salts of the general formula (1):

where Y is a substituted or unsubstituted aromatic substituent and $S_1$ is an organic group such as substituted or unsubstituted aromatic, aliphatic, cyclic, acyclic or polycyclic group, with the proviso that at least one of Y or $S_1$ be further substituted with at least one solubilizing group. Aromatic substituents which may be employed for the organic aromatic azo compounds employed in accordance with the invention may comprise carbocyclic or heterocyclic aromatic rings, which structures are well known in the chemical literature, and include single as well as linked or fused aromatic rings. Examples of carbocyclic aromatic substituents include, e.g., phenyl and naphthyl. Examples of heterocyclic aromatic (heteroaromatic) substituents include, e.g., pyrrolyl, pyridinyl, furyl, and puryl.

The soluble ionic salt can be formed from a number of different solubilizing functional groups substituted on $S_1$ or Y. In preferred embodiments of the invention, the solubilizing group comprises a carboxylic acid or sulfonic acid salt. In more preferred embodiments of the invention, the solubilizing group is a sulfonic acid salt. The counter ion of the salt can be selected from a wide range of inorganic or organic cations. Desirably, the inorganic cation is monovalent and has a low atomic number, such lithium, sodium, potassium, and ammonium counterions. Organic cations are desirably formed under alkaline conditions from amine bases. Organic amines are amines comprised of at least one organic substituent, and as employed in the invention the substituent is desirably an aliphatic group. In order to reduce the possibility of a chemical reaction of the amine with other ink ingredients, secondary amines are more preferred than primary amines. Most preferred are tertiary amines, where the neutral amine base has three organic substituents. The amine aliphatic group in turn may be substituted with any suitable functional groups that are compatible with the application of the ink jet ink. Specific examples include benzylamine, 2-phenylethylamine, N-methylbenzylamine, N,N-dimethylbenzylamine, N-propylbenzylamine, N-t-butyl-N-ethylaniline, cyclopentylamine, cyclohexylamine, N-,N-dimethylcyclohexylamine, trimethylamine, tri-n-butylamine, N,N-dimethyl-n-propylamine, N,N-dimethyl-i-butylamine, tetramethyldipropylenetriamine, pentamethyldipropylenetriamine, pentamethylenediethylenetriamine, 2,2,2-trifluoroethylamine, and 3,3,3-trifluoro-n-propylamine. Other examples include morpholine, N-methylmorpholine, N-ethylmorpholine, and dimethylpiperazine. More preferred are aliphatic amines substituted with hydroxyl groups, such as monoethanolamine, diethanolamine, 3-amino-1-propanol, N-methylethanolamine, N-benzyl-N-methylethanolamine, triethanolamine, 2-(2-aminoethoxy)ethanol, N,N-dimethyl-2-(2-aminoethoxy)ethanol, N-methyldiethanolamine, and N,N-dimethylethanolamine. Examples of aminopropanediol derivatives include 1-methyl-amino-2,3-propanediol, 1-amino-2,3-propanediol, 1-amino-2-ethyl-2,3-propanediol, 2-amino-2-methyl-1,3-propanediol, 2-amino-2-ethyl-1,3-propanediol, and 2-amino-2,3-propanediol.

A formula for one preferred embodiment of azo compounds for use in the invention is provided by the general formula (2);

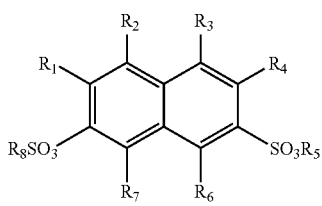

(2)

Substituents $R_1$, $R_2$, $R_3$, $R_4$, $R_6$, $R_7$ may be the same or different and each may represent individually or in combination hydrogen, hydrophobic and hydrophilic groups, aliphatic, aromatic, acyclic, cyclic, and polycyclic systems, with the proviso that at least one of $R_1$, $R_2$, $R_3$, $R_4$, $R_6$, and $R_7$ represents a substituted azo group of the formula $S_1$—N=N— where $S_1$ is as defined above in formula (1), and $R_5$ and $R_8$ represent H or an inorganic or organic cation as noted for formula (1). Examples of other possible $R_1$, $R_2$, $R_3$, $R_4$, $R_6$, and $R_7$ substituents include hydroxyl (HO), alkoxy, amino ($NH_2$) including substituted amines, such as dialkyl and monolkylamines, amido, nitro, azo, hydrogen, alkyl, aryl or a functionalized alkyl or aryl group. In a more preferred embodiment of the invention, at least one substituent $R_1$, $R_2$, $R_3$, $R_4$, $R_6$, $R_7$ is hydroxyl and at least one is a substituted azo group ($S_1$—N=N—). In another more preferred embodiment of the invention, at least one substituent from $R_1$, $R_2$, $R_3$, $R_4$, $R_6$, $R_7$ is hydroxyl and another is selected from the group amino or amido, and at least one is a substituted azo group ($S_1$—N=N—). $R_5$ and $R_8$ may be the same or different. Examples of $R_5$ and $R_8$ include hydrogen, alkali metal cations, such as sodium and potassium, and ammonium.

Another formula for another preferred embodiment of azo compounds for use in the invention is provided by formula 3:

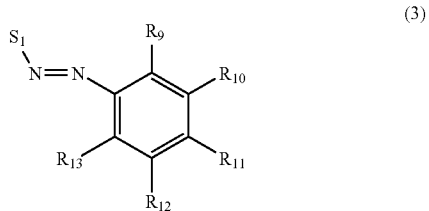

(3)

where $S_1$ is as defined above in formula (1) and substituents $R_9$ to $R_{13}$ may be the same or different and each may be selected from hydrogen, hydrophobic and hydrophilic groups, aliphatic, aromatic, acyclic, cyclic, and polycyclic systems with the proviso that at least one of $R_9$ to $R_{13}$ be a sulfonic acid (—$SO_3H$) or a conjugate base of sulfonic acid (e.g., —$SO_3Na$). In a more preferred embodiment of the invention, at least one of $R_9$ to $R_{13}$ is a sulfonic acid or a conjugate base of a sulfonic acid and one of $R_9$ to $R_{13}$ is a nitro group.

Specific examples of azo compounds of the type used in the invention are as follows:

Azo 1 (Direct Black 19):

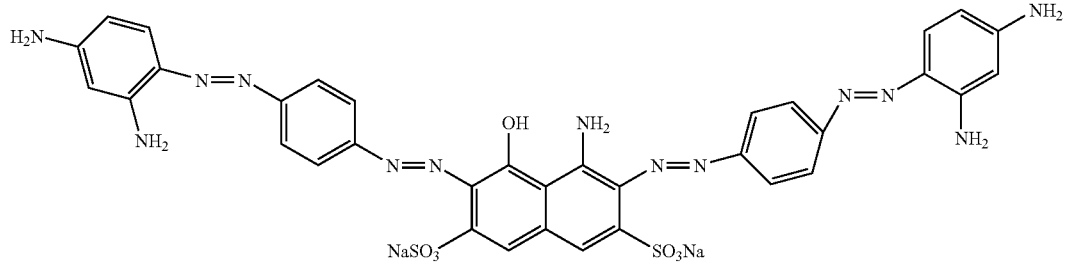

-continued
Azo 2 (Naphthol Blue Black):
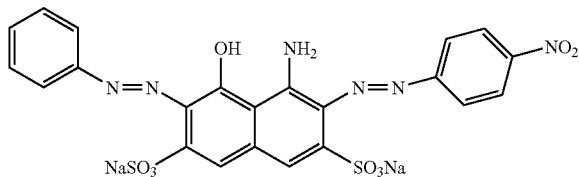
Azo 3:
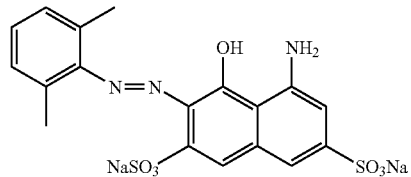
Azo 4:
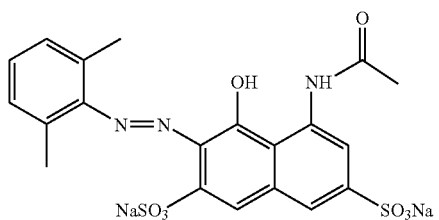
Azo 5:
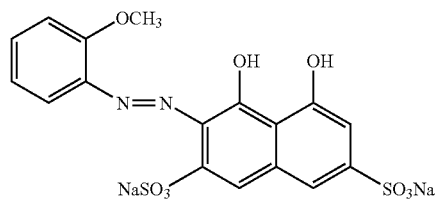
Azo 6 (Plasmocorinth B):
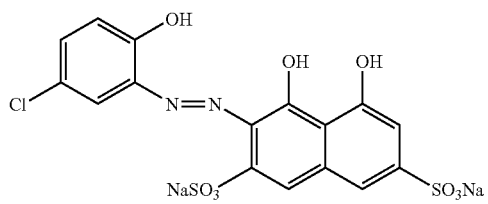
Azo 7:
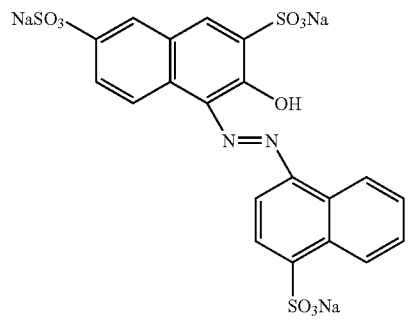
Azo 8:
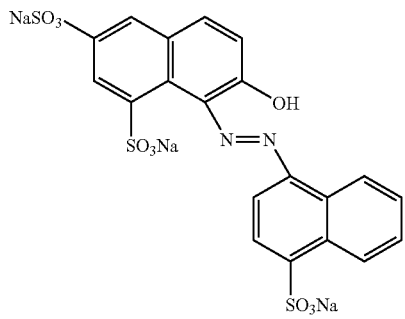
Azo 9:
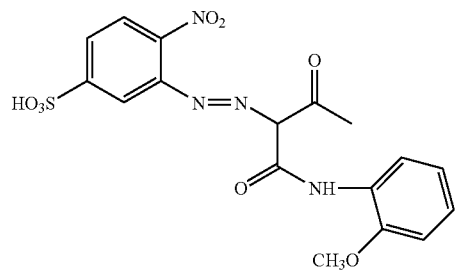
Azo 10:
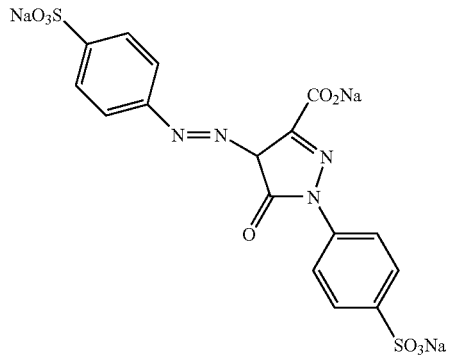

The colorant systems of the ink jet ink compositions employed in accordance with one embodiment of the invention may be dye-based, pigment-based or combinations of dye and pigment. Compositions incorporating pigment are particularly useful. Pigment-based ink compositions are used because such inks render printed images having higher optical densities and better resistance to light and ozone as compared to printed images made from other types of colorants. A wide variety of organic and inorganic pigments, alone or in combination with additional pigments or dyes, can be in the present invention. Pigments that may be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52.2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42. In accordance with one embodiment of the invention, colorants comprising cyan, magenta, or yellow pigments are specifically employed.

White pigments, which may be used in ancillary white ink compositions, may be those which are capable of rendering said ink composition white. Any of several white pigments, which are commonly used in this field, may be employed. Employed as such white pigments may be, for example, white inorganic pigments, white organic pigments, and fine white hollow polymer particles. White pigments include inorganic pigments such as sulfates of alkaline earth metals such as barium sulfate, carbonates of alkaline earth metals such as calcium carbonate, silica such as fine silicic acid powder, synthetic silicates, calcium silicate, alumina, alumina hydrates, titanium oxide, zinc oxide, talc, and clay. Specifically, titanium oxide is known as a white pigment which exhibits desired covering properties, coloring (tinting) properties, and desired diameter of dispersed particles. White organic pigments include organic compound salts disclosed in JP-A No. 11-129613, and alkylenebismelamine derivatives disclosed in JP-A Nos. 11-140365 and 2001-234093. Specific commercially available products of the aforesaid white pigments are Shigenox OWP, Shigenox OWPL, Shigenox FWP, Shigenox FWG, Shigenox UL, and Shigenox U (all are commercial product names, by Hakkoru Chemical Co.). Additionally fine white hollow polymer particles such as fine thermoplastic particles comprised substantially of an organic polymer, which are disclosed in U.S. Pat. No. 4,089,800 may be employed.

Pigment-based ink compositions employing non-self-dispersed pigments that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink. The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling medium is optionally present in the milling step (a) in order to facilitate break up of the pigments to primary particles. Inert milling media include such materials as polymeric beads, glasses, ceramics, metals and plastics as described, for example, in U.S. Pat. No. 5,891,231. The milling media described in U.S. Pat. No. 5,679,138 is preferred to obtain pigment dispersion of finer particle size. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, particularly useful dispersants include anionic, cationic or nonionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The preparation and use of covalently functionalized self-dispersed pigments suitable for inkjet printing are reported by Bergemann, et al., in U.S. Pat. No. 6,758,891 B2 and U.S. Pat. No. 6,660,075 B2, Belmont in U.S. Pat. No. 5,554,739, Adams and Belmont in U.S. Pat. No. 5,707,432, Johnson and Belmont in U.S. Pat. Nos. 5,803,959 and 5,922,118, Johnson et al in and U.S. Pat. No. 5,837,045, Yu et al in U.S. Pat. No. 6,494,943 B1, and in published applications WO 96/18695, WO 96/18696, WO 96/18689, WO 99/51690, WO 00/05313, and WO 01/51566, Osumi et al., in U.S. Pat. No. 6,280,513 B1 and U.S. Pat. No. 6,506,239 B1, Karl, et al., in U.S. Pat. No. 6,503,311 B1, Yeh, et al., in U.S. Pat. No. 6,852,156 B2, Ito et al., in U.S. Pat. No.

6,488,753 B1 and Momose et al., in EP 1,479,732 A1. Examples of commercially available self-dispersing type pigments include Cab-O-Jet 200®, Cab-O-Jet-250®, Cab-O-Jet-260®, Cab-O-Jet-270®, and Cab-O-Jet 300® (Cabot Specialty Chemicals, Inc.) and Bonjet CW-1® and CW-2® (Orient Chemical Industries, Ltd.).

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/111140A1; and graft copolymers; see for example, U.S. Pat. No. 5,231,131; U.S. Pat. No. 6,087,416; U.S. Pat. No. 5,719,204; or U.S. Pat. No. 5,714,538. Typically, these polymeric resins are copolymers made from hydrophobic and hydrophilic monomers. The copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. Polymer stabilized pigment dispersions have the additional advantage of offering image durability once the inks are dried down on the ink receiver substrate.

Polymeric dispersants (copolymers) are not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 A1 and US 2007/0043144 A1, the disclosures of which are incorporated herein by reference.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The copolymer dispersants preferably have a weight average molecular weight lower limit of greater than about 500 Daltons.

Encapsulating type polymeric dispersants and polymeric dispersed pigments thereof can also be used in the invention. Specific examples are described in U.S. Pat. No. 6,723,785, U.S. Pat. No. 6,852,777, US 2004/0132942 A1, 2005/0020731 A1, 2005/00951 A1, 2005/0075416 A1, 2005/0124726 A1, 2004/007749 A1, and 2005/0124728 A1, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US 2003/0199614 A1; US 2003/0203988 A1; or US 2004/0127639. Microencapsulated-type pigment particles are also useful and consist of pigment particles coated with a resin film; see for example U.S. Pat. No. 6,074,467.

The pigment particles useful in the invention may have any particle sizes which can be jetted through a printhead. Preferably, the pigment particles have a mean particle size of less than about 0.5 micron, more preferably less than about 0.2 micron.

In addition to or in place of dispersed pigment colorants, the aqueous inks employed in certain embodiments of the invention can contain dyes as primary or supplemental colorants. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; and the metal azo dyes disclosed in U.S. Pat. Nos. 5,997,622 and 6,001,161. Useful dye-based colorant systems for traditional, nickel-based continuous ink jet printheads are disclosed in EP 0 781 818 B1, the disclosure of which is incorporated by reference. Also useful in the invention as supplemental colorants are polymeric dyes or loaded-dye/latex particles. Examples of polymeric dyes are described in U.S. Pat. No. 6,457,822 B1 and references therein. Examples of loaded-dye/latex particles are described in U.S. Pat. No. 6,431,700 B1; US 2004/0186199 A1; US 2004/0186198 A1; US 2004/0068029 A1; US 2003/0119984 A1; and US 2003/0119938 A1. The supplemental colorants used in the ink composition of the invention may be present in any effective amount, generally from about 1.0 to 10% by weight, and preferably from about 2.0 to 5% by weight.

It is noted that some of the azo compounds useful as silicon etch deterrents in accordance with the invention are dye compounds. A particular advantage of the invention is that typically lower concentrations of such compounds are required to provide silicon etch inhibition than is required to provide substantial dye density in an aqueous ink formulation. Accordingly, relatively low levels, such as less than 2 weight percent, or less than about 1 weight percent, or even less than 0.1 weight percent, may be employed to effectively minimize corrosion, while only minimally impacting coloration of the aqueous formulation into which they are incorporated. Effective amounts of such compounds for corrosion inhibition may typically start at about 0.001 weight percent, although even lower concentrations may still provide some benefit.

Any water-soluble humectant known in the ink-jet art and compatible with the other requirements of the invention can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols with average molecular weights ranging from 200 to about 5000 Daltons, the polypropylene glycols with average molecular weights ranging from 200 to about 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives; (4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone; (5) sulfur-containing compounds such as 2,2'-thiodiethanol, dimethyl sulfoxide and tetramethylene sulfone; and (6) water soluble N-oxides such as 4-methylmorpholine-N-oxides. Of these, glycerol and the polyhydric alcohol derivatives thereof are preferred and glycerol is especially preferred. The polyhydric alcohol derivatives of glycerol include the glycerol ethoxides, glycerol propoxides and glyceryths. The humectant can be employed alone or in combination with one or more additional listed humectants. The useful humectants have melting points below the typical operating temperature of the intended printer system to avoid the formation of crystalline deposits on the printhead or in the maintenance system. Practically, this means that the useful humectants have melting points below 30° C., preferably below 20° C. and more preferably below 10° C. When glycerol and the polyhydric alcohol derivatives thereof are employed, they can preferably be employed at between 1 and 20% by weight, more preferable at between 2 and 15% by weight and most preferable at between 3 and 10% by weight. While any quantity of water soluble humectants singly or in combination and dynamic surface tension reducing agents can be employed, the total quantity of water soluble humectant and dynamic surface tension reducing agents is preferably at between 3 and 30 percent by weight and more preferably at between 8 and 20 percent by weight.

In contrast to sheet-fed drop-on-demand printing, CIJ is a very high speed printing process, and it is desired to operate paper roll-fed web transport presses at substrate transport speeds in excess of 300 m/s. Printing speed alone imposes some limitations on ink formulation relative to slower drop-on-demand printing techniques, simply on the basis of the short time requirements for adequately drying the printed substrate moving at full speed in the press before roll wind-up. Surprisingly, features of CIJ printhead operation can allow wider ink formulation latitude than is possible in DOD printing in other respects, however. Ink formulation considerations specific to traditional CIJ printing are described in W. Wnek, IEEE Trans. 1986, 1475-81, which elucidates the ink performance requirements for drop formation, deflection and catching of non-printing drops, recirculation of the ink to the printhead from the storage reservoir for future printing, and also for commercial ink-media image quality and durability.

An ink jet ink composition for use in a continuous ink jet printer desirably contains water as the principal vehicle or carrier medium, colorant, humectant, biocide, and surfactant; it can desirably further contain one or more types of other components, including and not limited to a film-forming binder or mordant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal agent, a jetting aid, a filament length modifier, a trace of multivalent cationic flocculating salt, a solution conductivity control agent, or a compound for suppressing electrostatic deflection charge shorts when ink dries on the charge ribbon electrodes.

The total humectant level of the ink jet ink composition for CIJ printing is desirably from 0 to about 10% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in U.S. 2005/0075415 A1 to Harz et al. More desirably, the total humectant level is from about 1% to about 5%, in order to facilitate drying of the ink jet printing recording material in a high speed printer while simultaneously encouraging higher equilibrium moisture content in dried ink film on hardware for redispersion and clean-up by ink, or by start-up and shut-down fluids, or by a printhead storage fluid.

The pH of the aqueous ink compositions of the invention may be adjusted by the addition of organic or inorganic acids or bases. Useful inks may have a preferred pH of from about 2 to 11, depending upon the type of dye or pigment being used and depending on the charge characteristics of the other ink components employed. Anionic charge stabilized anti-abrasion polymers are employed in inks having a pH of above about 6, with preferred pH ranges of between 7 and 11 and a more preferred pH range of between 7.5 and 10. Typical inorganic acids include nitric, hydrochloric, phosphoric and sulfuric acids. Typical organic acids include methanesulfonic, acetic, formic and lactic acids. Typical inorganic bases include alkali metal hydroxides and carbonates. Typical organic bases include ammonia, triethanolamine and tetramethylethlenediamine. The ink composition pH is desirably adjusted to be from about 7 to about 9.5; more desirably, the pH ranges from about 8 to about 9. Amine bases especially desirable in the application of the invention to CIJ printing include 3-amino-1-propanol, N,N-dimethanolamine, N,N-dimethylethanolamine, N,N-diethylethanolamine, and triethanolamine.

The inks of the invention may contain surfactants added to adjust the static surface tension or dynamic surface tension of the ink to an appropriate level. The surfactants may be anionic, cationic, amphoteric or nonionic and used at, e.g., levels of 0.01 to 5% of the ink composition. Defoaming agents comprised of phosphate esters, polysiloxanes, or acetylenic diols are optionally used with the ink compositions directed at CIJ to minimize foam formation caused the fluid agitation associated with drop catching and ink recirculation.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548B2 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967B1. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632 B1. Colorless inks are also used to provide an overcoat to a printed image, usually in order to improve scratch resistance and waterfastness; see for example, US 2003/0009547 A1 or EP 1,022,151 A1. Colorless inks are also used to reduce gloss differential in a printed image; see for example, U.S. Pat. No. 6,604,819 B2; US 2003/0085974 A1; US 2003/0193553 A1; or US 2003/0189626 A1. Examples of inorganic particles useful in the aqueous compositions and inks employed in the invention include, but are not limited to, alumina, bohemite, clay, calcium carbonate, titanium dioxide, calcined clay, aluminosilicates, silica, or barium sulfate.

The present invention also includes substantially colorless maintenance fluid compositions formulated with azo compounds in accordance with the invention which are used in printing system service applications. These solutions may or may not be used for drop formation and are not intended for marking a substrate. Some examples include printhead storage fluids, line flush fluids, apparatus cleaning fluids, printhead alignment manufacturing fluids, and so forth. A printhead storage fluid can be used for wet shutdown and storage of the MEMS printhead when inactive. It can be comprised of functional ingredients such as biocides, surfactants, detergents, solvents (e.g., isopropanol), solvosurfactants (e.g., a glycol ether), a pH buffer, and metal corrosion inhibitors. A flush fluid can be used to recirculate through the printhead in a cross-flush mode in order to straighten crooked jets.

In substantially colorless compositions of certain embodiments of the invention, the azo compounds are present in concentrations sufficient to minimize corrosion, but insufficient to exhibit significant colorant density when printed. E.g., the azo compounds may be present at a concentration of less than or equal to about 1.0 weight percent, more preferably from about 0.001 to less than 1.0 weight percent, and most preferably from about 0.01 to less than about 0.2 weight percent. Further, such substantially colorless compositions further comprise less than 2 weight percent of any colorants, more preferably less than about 1.0 weight percent of any compounds that are colorants, and most preferably less than about 0.1 weight percent of any other compounds that are colorants. Maintenance fluids may have a wider range of pH latitude than inks, because they can be free of pH-sensitive components such as pH-sensitive dispersions. These maintenance fluids may have applications in non-printing silicon MEMS technologies as well, such as cleaning or preserving a fluidic device. Desirably, the azo compound of the invention is present at a level of 2 w/w % or less. More desirably, the azo compound of the invention is present at concentration of 1 w/w % or less. Most desirably, the azo compound is present in a concentration of between 0.001% and 0.1%.

The non-colored particles used in the ink compositions may be present in any effective amount, generally from 0.01 to 20% by weight, and preferably from 0.01 to 6% by weight. The exact choice of non-colored particles will depend upon the specific application and performance requirements of the printed image.

A biocide may be added to an inkjet ink composition to suppress the growth of microorganisms such as molds, fungi, etc. in aqueous inks. Preferred biocides for an ink composition are Proxel® GXL (Arch Chemicals Inc.) at a final concentration of 0.0001-0.5 wt. %, or Kordek® MLX (Rohm and Haas Co.) in the same concentration range. Additional additives, which may optionally be present in an inkjet ink composition include thickeners, drying agents, waterfastness agents, dye solubilizers, chelating agents, binders, light stabilizers, viscosifiers, buffering agents, anti-mold agents, anti-curl agents, anti-corrosion a gent, stabilizers and defoamers.

The exact choice of ink components will depend upon the specific application and performance requirements of the printhead from which they are to be jetted. For current continuous ink ejection mode, acceptable viscosities are no greater than 10 cP, preferably in the range of 1.0 to 5.0 cP.

In one embodiment of the invention, the ink jet ink composition for use in a continuous ink jet printer is printed by a method employing a plurality of drop volumes formed from a continuous fluid stream and non-printing drops of a different volume than printing drops are diverted by a drop deflection means into a gutter for recirculation, as disclosed in U.S. Pat. No. 6,588,888 B2 to Jeanmaire et al., U.S. Pat. No. 6,554,410 B2 to Jeanmaire et al., U.S. Pat. No. 6,682,182 B1 to Jeanmaire et al., U.S. 2003/0202054 A1 to Jeanmaire et al., U.S. Pat. No. 6,793,328 B2 to D. Jeanmaire, U.S. Pat. No. 6,866,370 B2 to D. Jeanmaire, U.S. Pat. No. 6,575,566 B1 to Jeanmaire et al., and U.S. Pat. No. 6,517,197 B2 to Hawkins et al., the disclosures of which are herein incorporated in their entirety by reference. In another preferred embodiment, the ink jet ink composition is printed using an apparatus capable of controlling the direction of the formed printing and non-printing drops by asymmetric application of heat to the fluid stream that initializes drop break-up and serves to steer the resultant drop, as disclosed in U.S. Pat. No. 6,079,821 B2 to Chwalek et al, and in U.S. Pat. No. 6,505,921 B2 to Chwalek et al., the disclosures of which are herein incorporated in their entirety by reference. Useful ink agitation, heated ink supply and printhead and fluid filtration means for CIJ pigmented ink jet ink compositions are described in U.S. Pat. No. 6,817,705 B13 to Crockett et al. Printer replenishing systems for maintaining ink quality and countering the effects of ink volatile component evaporation are described in U.S. Pat. No. 5,526,026 to M. Bowers, U.S. Pat. No. 5,473,350 to Mader et al., and EP 0 597 628 A1 to Loyd et al.

The following examples illustrate the utility of the present invention.

EXAMPLES

Example 1

Buffered Solutions

This example shows how the materials disclosed in the present invention have been used to minimize corrosion in buffer solutions. The buffers were prepared by adding N-methyldiethanolamine (MDEA) to water and adjusting to the experimental pH value through addition of acetic acid (HOAc). Corrosion of the silicon has been measured on silicon (Si(100)) coupons (26 mm×26 mm, 0.3 mm thick) in situ via low coherence interferometry, using the method of Dockery et al. disclosed in US 2009/0065478 A1 in a recirculation system capable of regulating temperature, pressure, and flow.

The observed rates of etching provide a direct measure of silicon corrosion, and consequently a definitive means of evaluating inhibition of silicon corrosion. All of the experiments detailed in Table 1 were carried out at pressure of 131 kPa.

TABLE 1

Silicon Etching with Buffers.

| Entry | Type | Base solution | Addenda | Conc. (wt %) | pH | Temp. (° C.) | Etch rate (nm h$^{-1}$) |
|---|---|---|---|---|---|---|---|
| 1 | comp. | 2.5% MDEA/HOAc | | | 8.75 | 64.1 | 82 |
| 2 | comp. | 2.5% MDEA/HOAc | | | 8.75 | 71.5 | 130 |
| 3 | inv. | 2.5% MDEA/HOAc | Azo 1 | 0.045 | 8.75 | 71.2 | 1.1 |
| 4 | inv. | 0.8% MDEA/HOAc | Azo 1 | 1.5 | 8.69 | 72.8 | 0.9 |

The data presented in entries 1 and 2 demonstrates that corrosion of silicon is significant even in moderately alkaline buffers, with observed etch rates in the range of tenths of microns an hour under the experimental conditions. The increase in etch rate with temperature (entry 2 vs. entry 1) shows that corrosion is accelerated by heating. Based on the observed etch rates, the Arrhenius activation barrier for silicon etching with the MDEA buffers is calculated to be 14 kcal/mol. In contrast to the rapid silicon etching observed in the buffers alone, with the buffers formulated according to the invention (entries 3 and 4 in Table 1), the etch rates approach limits of detection (1 nm/h), i.e., the invention formulations show 100× lower silicon corrosion than the comparison formulations. The data shown in entry 3 show that even with low concentrations of the invention azo compounds, formulations of the type disclosed in the invention are capable of effectively inhibiting corrosion.

Example 2

Ink Vehicle Solution

In this example, the corrosion of silicon has been evaluated for a series of formulations prepared from a solution containing humectants and surfactants of the type commonly used in inkjet ink formulations. These experiments provide a means of evaluating the silicon corrosion inhibition of the invention formulations in more practical embodiments of the invention as compared to the buffer formulations presented in Example 1. The formulation of the base solution (Solution 1, Sol. 1) is presented in Table 2.

TABLE 2

Formulation of Solution 1 (Sol. 1).

| Component | Concentration |
|---|---|
| Deionized Water | 92.7 wt % |
| Proxel GXL | 0.10 wt % |
| Cobratec TT-50S | 0.10 wt % |
| Acetic Acid | 0.25 wt % |
| MDEA | 0.80 wt % |
| Glycerol | 6.00 wt % |
| Surfynol 440 | 0.06 wt % |
| Surfynol DF-110L | 0.03 wt % |

TABLE 3

Silicon Etching with Sol. 1 Based Formulations (Pressure = 131 kPa).

| Entry | Type | Base solution | Addenda | Addenda conc. (wt %) | pH | Temp. (° C.) | Etch rate (nm h$^{-1}$) |
|---|---|---|---|---|---|---|---|
| 1 | comp. | Sol. 1 | | | 8.60 | 63.7 (±0.5) | 56 (±6) |
| 2 | comp. | Sol. 1 | | | 8.60 | 57.5 (±0.8) | 28.6 (±5.7) |
| 3 | comp. | Sol. 1 | | | 8.54 | 51.1 | 18 |
| 4 | comp | Sol. 1 | Comp. 1 (CASRN 9084-06-4) | 2 | 8.61 | 56.1 | 58.9 |
| 5 | inv. | Sol. 1 | Azo 1 | 1.5 | 8.72 | 73.8 | nd |
| 6 | inv. | Sol. 1 | Azo 2 | 0.8 | 8.63 | 56.4 | 0.16 |
| 7 | inv. | Sol. 1 | Azo 3 | 0.5 | 8.67 | 70.7 | 1.8 |
| 8 | inv. | Sol. 1 | Azo 4 | 0.25 | 8.63 | 57.4 | 0.11 |
| 9 | inv. | Sol. 1 | Azo 5 | 0.45 | 8.69 | 57.6 | 0.75 |
| 10 | inv. | Sol. 1 | Azo 6 | 2.1 | 8.62 | 57.6 | 10.7 |
| 11 | inv. | Sol. 1 | Azo 7 | 0.5 | 8.72 | 59.2 | nd |
| 12 | inv. | Sol. 1 | Azo 8 | 0.63 | 8.67 | 58.05 | 22.6 |
| 13 | inv | Sol. 1 | Azo 9 | 0.2 | 8.69 | 59.4 | nd |
| 14 | inv. | Sol. 1 | Azo 10 | 0.68 | 8.63 | 57.1 | 2.7 | nd = not detected

The comparison data shown in entries 1 and 2 in Table 3 are median values and standard deviations from multiple experiments. For entry 1, the data presented are from the median of two measurements. For entry 2, the data presented are from the median of 16 measurements. The data presented in Table 3 in entries 1-3 shows that a buffered solution containing humectants and surfactants can readily corrode silicon, and the corrosion process is accelerated by temperature. The observed etch rates for Sol. 1 are comparable to those for the buffer alone (Table 1 entry 1 vs. Table 3 entry 1). When a simple non-azo containing sulfonated naphthalene derivative (Comp. 1) was added to Sol. 1 (Table 3, entry 4), silicon corrosion was found to be more rapid than Sol. 1 alone.

The silicon corrosion results for formulations of the type in accordance with the invention have been provided in Table 3 entries 5-14. As in the buffer solution (Table 1 entries 3 and 4), Azo 1 has been found to be an effective silicon corrosion inhibitor when formulated with surfactants and humectants, with no observed silicon etching even at elevated temperature (Table 3 entry 5). More preferred embodiments of invention such as those shown in entries 6-8 have also been found to effectively inhibit silicon corrosion with minimal silicon etch rates ca 1 nm/h or less. The rates of corrosion are approximately 100× lower for the invention solutions relative to the comparison Sol. 1 formulations at comparable temperatures. Preferred embodiments of the invention, such as those presented in Table 3, entries 9 and 10 also exhibit inhibition of silicon corrosion. In entries 11 and 12, more preferred and less preferred hydroxylated sulfonated azonaphthalene derivatives have been evaluated. The more preferred formulation containing Azo 7 has effectively inhibited silicon corrosion under the experimental conditions to a greater degree than the rate of corrosion for the less preferred isomer (Azo 8) (Table 3 entry 12 vs. Table 3 entry 2). The final entries in Table 3, entries 13 and 14, provide corrosion characteristics for arylazo compounds of the invention which do not contain hydroxylated sulfonated naphthalenes. Both formulations have been found to inhibit corrosion, with the Azo 9 found to be particularly effective at inhibiting silicon etching.

Comp. 1 (CAS Registry No. 9084-06-4 (Lomar LS, Cognis Corp.)):

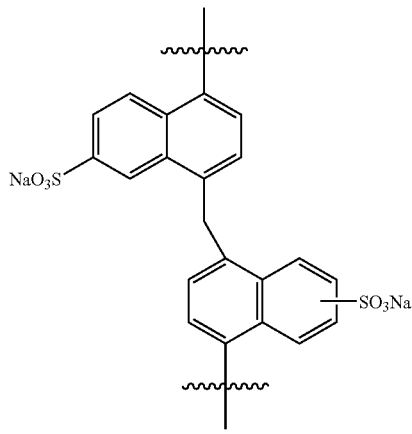

Example 3

Continuous Ink Jet Ink Compositions

The abbreviation "wt %" indicates the ingredient weight percent. Carbon black pigment dispersion content is based on the weight percent of carbon black.
Polymeric Dispersant Preparation
Polymeric Dispersant P-1
In a 1-liter, three-necked round-bottom flask equipped with a reflux condenser were mixed under nitrogen atmosphere 37.0 g of benzyl methacrylate, 30.0 g of stearyl methacrylate, and 33.0 g of methacrylic acid, 1.5 g of 1-dodecanethiol, 400 mL of methyl ethyl ketone, and 1.2 g of AIBN. The solution was stirred and purged with nitrogen for 20 minutes and heated to 70° C. in a constant temperature bath. After 24 hours, the resulting solution was cooled. The resulting polymer solution was mixed with water and dimethylaminoethanol to achieve 100% acid neutralization. Thereafter the whole mixture was distilled at 50° C. under reduced pressure to remove the organic solvent. The final polymer solution had a concentration of ca. 20 wt % in water and its pH was ca. 7. The weight average molecular weight was about 10,800 Daltons.
Polymeric Dispersant P-2
A 5-liter, three-necked round bottom flask equipped with a mechanical stirrer, a reflux condenser, and a gas inlet was charged with 225 g of 1-methoxy-2-propanol and was sparged with nitrogen. Akzo-Nobel Chemicals, Inc., initiator Perkadox AMBN-GR (1.9 g) was added with stirring. A reactant reservoir was charged with 225 g of 1-methoxy-2-propanol, 23.4 g of 1-dodecanethiol, 203.5 g of benzyl methacrylate, 165.0 g of stearyl methacrylate, and 181.5 g of methacrylic acid, and the solution was degassed by nitrogen sparging. AMBN-GR (7.7 g) was added and mixed in. The reactor temperature was raised to 77° C. and the reactants were pumped from the reservoir at a about 2.3 mL/min over a 360-min period. The reaction mixture was stirred for at least 12 h at about 77° C. The polymer was neutralized to completion with dimethylaminoethanol and stirred for 45 min. The reaction mixture was diluted with 2,580 g of water and filtered through a Pall Corp. Ultipleat polypropylene cartridge filter. The final polymer solution had a concentration of ca. 20 wt. % solids and its pH was 8.6. The average the weight average molecular weight was 9,070 Daltons.
Pigment Dispersion Preparation
Pigment Dispersion K-1
To a 2.5-gallon, 9-inch diameter and 12-inch deep, double-walled stainless steel mixing vessel containing four baffles is added water (1,273 g) and a solution of Polymeric Dispersant P-1 (727 g of a 20.6 wt % solution). A nominal 4-inch, ring-style disperser impeller (Hockmeyer Equipment Corp. D-Blade) driven by a Charles Ross & Son Co. Model HSM-100LH-2 High Shear Mixer is centered 2 inches above the bottom of the mixing vessel, and stirring is initiated. Degussa GmbH. NIPex® 180 IQ carbon black pigment (500 g) is slowly integrated into the fluid. Milling media comprising beads of polystyrene resin (copolymer of styrene and divinylbenzene/ethylvinylbenzene mixture) with an average particle diameter of 50 micrometers (3,000 g) is added slowly while increasing impeller speed. The mixture is milled with an impeller blade tip speed of ca. 19 m/sec for about 20 h at an internal temperature of 25-35° C. Samples are periodically removed, diluted and filtered for particle size determination by a Microtrac, Inc., Nanotrac® 150 dynamic light scattering analyzer. When milling is complete, the dispersion/media milling mixture is further diluted with a solution of water (2,475 g) and Rohm and Haas Co. Kordek™ MLX preservative (25 g) to a final pigment concentration of about 10% and theoretical dispersion batch size of 5000 g. The impeller is removed from the dispersion/media milling mixture, and a vacuum separator filter probe is immersed. The filter probe consists of 0.25-inch ID Tygon® plastic tubing connected to a sealed 2-inch length of 1.25-inch OD tubular, 38-micrometer screen (Johnson Screens, Inc.). A peristaltic pump is used to separate the dispersion from the milling media and it is subsequently filtered through a 0.3-micrometer removal efficiency Pall Corp. Profile II® depth filter. Roughly 4 kg of dispersion is recovered, approximately 80% yield. The volume-weighted $50^{th}$ percentile particle size distribution diameter is about 62 nm, and the $95^{th}$ percentile particle size distribution diameter is about 110 nm.
Pigment Dispersion K-2
Using a procedure analogous to Pigment Dispersion K-1, NIPex 180 IQ carbon black pigment (500 g) is dispersed in a solution of water (1,000 g) and a solution of Polymeric Dispersant P-2 (1,000 g of a 20.1 wt % solution) using the 50-micrometer average diameter polymeric resin milling media (3,000 g) over 20 h. Following milling, the dispersion/media milling mixture is diluted with a solution of Kordek MLX (25.0 g) in water (2,475 g) to a final pigment concentration of about 10% and theoretical dispersion batch size 5,000 g. The dispersion is separated from the milling media and it is subsequently filtered through a 0.3-micrometer effective pore diameter depth filter. Roughly 4 kg of dispersion is recovered, approximately 80% yield. The volume-weighted $50^{th}$ percentile particle size distribution diameter is about 60 nm, and the $95^{th}$ percentile particle size distribution diameter is about 105 nm.

Preparation of Continuous Ink Jet Ink Samples

Black pigmented continuous ink jet ink compositions Inks A-F were prepared from the pigment dispersions K-1 and K-2 by combining the ingredients at the relative proportions reported in Table 4. In a representative procedure, 500 g of ink is prepared by combining the ingredients with good mixing proportioned according to Table I in a 1-liter polyethylene beaker containing a magnetic stirrer bar, in the following functional component order: water, acid, base, humectant, biocide, corrosion inhibitor, azo compound (Azo 1, Direct Black 19), pigment dispersion, surfactant, and antifoamant. The ink composition is mixed for about 2 min between ingredient additions, and then it is stirred for 1 hour after the addition of the antifoamant. The ink composition is filtered under 76 Torr of vacuum through a 47 mm Pall Corp. Versapor®-1200 membrane and then stored in a sealed bottle.

Yellow pigmented continuous ink jet ink G was prepared in a manner similar to the black pigmented inks by combining 28 wt % of organic polymer-dispersed Pigment Yellow 74 pigment dispersion (ca. 10 wt % Sunbrite® Yellow pigment with 0.1 wt % of Azo 9 (Sun Chemical Corp.)); 0.08 wt % of surfactant; 6 wt % of humectant; 1 wt % of an aqueous solution of 20% potassium acetate resistivity modifier; 0.2 wt % of defoamer; 3.3 wt % of an aqueous solution of 20% organic polymer binder; 0.1 wt % of Cobratec TT-50S metal corrosion inhibitor; 0.1 wt % Proxel GXL biocide; and 61 wt % of deionized water.

In this example, the corrosion characteristics of pigmented inkjet inks have been evaluated. The inks have been formulated with and without corrosion inhibitors of the present invention. The comparison inks are comprised of buffers, humectants, and surfactants like those shown in Sol. 1 in addition to pigments such as carbon black. The invention formulations also contain silicon corrosion inhibitors of the invention. The results have been summarized in Table 4. It is evident from entries 1-7 in Table 5 for the comparison formulations that corrosion of silicon can occur with inkjet inks. Even at relatively modest temperatures (Table 4, entries 2 and 7) and even in only moderately alkaline solutions (Table 4, entry 3), silicon has been found to corrode with etch rates in the tens of nm per h and higher. By contrast, the corresponding black ink formulations of the invention, entries 8 and 9 show a much reduced propensity to corrode silicon (e.g., Table 5 entry 8 vs. Table 5 entry 4: the invention example entry 8 has been found to be at least 50× less corrosive, based on etch rates). The data shown in Table 4 entry 9 show that even at elevated temperature and in a more alkaline (high pH value) ink formulation, silicon corrosion remains low.

TABLE 4

Black Pigmented Continuous Inkjet Ink Compositions

| Functional Component | Ingredient | Ink A (Wt %) | Ink B (Wt %) | Ink C (Wt %) | Ink D (Wt %) | Ink E (Wt %) | Ink F (Wt %) |
|---|---|---|---|---|---|---|---|
| Vehicle | Water | 49 | 39 | 44 | 31 | 30 | 48 |
| Pigment Dispersion | K-1 | 47 | | | | | |
| | K-2 | | 53 | 49 | 53 | 53 | 44 |
| Azo compound concentrate | Sensient Direct Black 19 Solution SF [17.65 w/w % Direct Black 19, Sensient Colors, Inc.] | | | | 8.5 | 8.5 | 1.2 |
| Humectant | Glycerine | 3.0 | 6.0 | 6.0 | 6.0 | 7.9 | 4.5 |
| Acid | Acetic acid | | 0.39 | | 0.25 | 0.28 | 0.41 |
| Base | N,N-Dimethyl-ethanolamine | | | | | 0.64 | |
| | N-Methyl-diethanolamine | | 1.44 | | 0.80 | | 1.63 |
| Biocide | PROXEL® GXL [Arch Chemicals, Inc.] | 0.10 | 0.10 | 0.10 | 0.10 | 0.10 | 0.10 |
| Corrosion Inhibitor | COBRATEC TT-50S [PMC Specialties Group, Inc. | 0.10 | 0.10 | 0.10 | 0.10 | 0.10 | 0.10 |
| Surfactant | SURFYNOL® 440 [Air Products and Chemicals, Inc.] | 0.06 | 0.06 | 0.06 | 0.06 | 0.06 | 0.06 |
| Antifoamant | SURFYNOL® DF-110L [Air Products and Chemicals, Inc.] | 0.15 | 0.08 | 0.08 | 0.08 | 0.08 | 0.08 |

The final entry table 5, an invention formulation of a yellow ink (Ink G), also shows desirable minimal silicon corrosion.

TABLE 5

Silicon Etching with Pigmented Inks (Pressure = 131 kPa).

| Entry | Type | Ink | Addenda | Addenda (wt %) | Pigment (wt %) | pH | Temp. (° C.) | Etch rate (nm h$^{-1}$) |
|---|---|---|---|---|---|---|---|---|
| 1 | comp. | A | | 0 | 5 | 8.27 | 49.1 | 52.7 |
| 2 | comp. | A | | 0 | 5 | 8.45 | 46.2 | 26.5 |
| 3 | comp. | A | | 0 | 5 | 8.04 | 60.1 | 85.1 |
| 4 | comp. | B | | 0 | 5.5 | 8.63 | 56.8 | 102.5 |
| 5 | comp. | B | | 0 | 5.5 | 8.55 | 48.7 | 53.8 |
| 6 | comp. | C | | 0 | 5 | 8.50 | 52.2 | 44.7 |
| 7 | comp. | C | | 0 | 5 | 8.50 | 40.5 | 16.4 |
| 8 | inv. | D | Azo 1 | 1.5 | 5.5 | 8.53 | 59.1 | 1.7 |
| 9 | inv. | E | Azo 1 | 1.5 | 5.5 | 8.92 | 70.0 | 3.3 |
| 10 | inv. | F | Azo 1 | 0.2 | 4.5 | 8.75 | 69.5 | nd |
| 11 | inv. | G | Azo 9 | 0.1 | 3 | 8.33 | 70.4 | 1.5 | nd = not detected

Example 4

Printhead Nozzleplate Recirculation Testing

This example shows the advantages of invention inks relative to inks of the type known in the art when the inks are used in a continuous flow inkjet system with a continuous flow inkjet printhead die. In this experiment, a continuous flow inkjet recirculation system has been assembled by mounting a silicon-based MEMS continuous flow inkjet printhead die (87 mm in length×5 mm in width, 0.4 mm thick, 236 nozzles per cm, nozzle diameter: 9 μm) in a fixture coupled to an assembly capable of regulating and measuring pressure, flow, and temperature. In this example, the pressure and temperature have been regulated to remain constant. The experimental conditions and results have been summarized in Table 6.

TABLE 6

Printhead Performance with Black Inks.

| Entry | Type | Ink | Addenda | Level (Wt %) | Pressure (kPa) | Temp. (° C.) | Flow | Performance |
|---|---|---|---|---|---|---|---|---|
| 1 | comp. | A. | | 0 | 414 | 60 | 125 | failure after 100 h operation |
| 2 | inv. | D | Azo 1 | 1.5 | 414 | 60 | 125 | No change in flow or pressure after 188 h |

In the case of the MEMS CIJ printhead die used with the comparison ink (Table 6, entry 1), the printhead fails after 100 h of jetting the ink, as indicated by a sudden increase in the observed flow rate and an inability to maintain a constant pressure of 414 kPa. Visual inspection of the failed device showed that the silicon membranes separating the channels in the printhead die had corroded, causing physical damage to the printhead die. By contrast, even after 188 h of jetting the invention ink, there were no observed pressure or flow changes in the system. Visual inspection of the printhead die used with the invention ink did not show evidence for corrosion of the silicon channels. Clearly, use of the invention ink in the CIJ system significantly improves robustness.

The invention has been described in detail with particular reference to certain preferred embodiments thereof, but it will be understood that variations and modifications can be effected within the spirit and scope of the invention.

What is claimed is:

1. A process for printing an aqueous ink composition with an inkjet printer comprising a silicon-based material which contacts the ink composition, comprising loading the printer with an aqueous ink composition and ejecting the ink composition against a recording material, wherein the ink composition comprises at least a first primary colorant and a soluble organic aromatic azo compound in a concentration lower than that of the primary colorant and sufficient to inhibit corrosion of the silicon-based material when contacted by the ink composition, and wherein the primary colorant comprises a non-self dispersed-pigment and the soluble aromatic azo compound is present at a concentration of from 0.001 to less than 1.0 weight percent.

2. The process according to claim 1, wherein the soluble organic aromatic azo compound comprises a compound of formula (1):

(1)

wherein Y is a substituted or unsubstituted aromatic substituent and S$_1$ is a substituted or unsubstituted aromatic, aliphatic, cyclic, acyclic or polycyclic organic group, with the proviso that at least one of Y or S$_1$ be substituted with at least one solubilizing group.

3. The process according to claim 2, wherein at least one of Y or S$_1$ is substituted with at least one sulfonic acid salt group.

4. The process according to claim 1, wherein the soluble organic aromatic azo compound comprises a compound of formula (2):

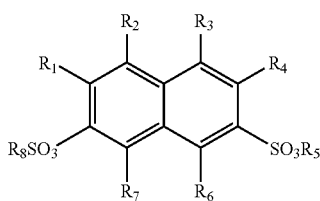

(2)

wherein $R_1$, $R_2$, $R_3$, $R_4$, $R_6$, and $R_7$ may be the same or different and each represent individually or in combination hydrogen, hydrophobic and hydrophilic groups, aliphatic, aromatic, acyclic, polycyclic, and cyclic systems, with the proviso that at least one of $R_1$, $R_2$, $R_3$, $R_4$, $R_6$, and $R_7$ represents a substituted azo group of the formula $S_1$—N=N— where $S_1$ is a substituted or unsubstituted aromatic, aliphatic, cyclic, acyclic or polycyclic organic group, and R5 and R8 represent H or an inorganic or organic cation.

5. The process according to claim 4, wherein at least one substituent $R_1$, $R_2$, $R_3$, $R_4$, $R_6$, $R_7$ is hydroxyl.

6. The process according to claim 4, wherein at least one substituent from $R_1$, $R_2$, $R_3$, $R_4$, $R_6$, $R_7$ is hydroxyl and at least one other is amino or amido.

7. The process according to claim 1, wherein the soluble organic aromatic azo compound comprises a compound of formula (3):

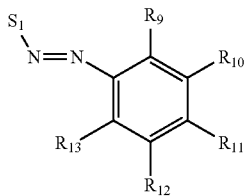

(3)

where $S_1$ is a substituted or unsubstituted aromatic, aliphatic, cyclic, acyclic or polycyclic organic group, and $R_9$ to $R_{13}$ may the same or different and each are selected from hydrogen, hydrophobic and hydrophilic groups, aliphatic, aromatic, acyclic, polycyclic, and cyclic systems with the proviso that at least one of $R_9$ to $R_{13}$ be a sulfonic acid group or a conjugate base of sulfonic acid group.

8. The process according to claim 7, wherein at least one of $R_9$ to $R_{13}$ is a nitro group.

9. The process according to claim 1, wherein the primary colorant comprises a yellow, magenta, or cyan pigment.

10. The process according to claim 1, wherein the inkjet printer is a continuous inkjet printer which employs a silicon-based drop generating printhead.

11. The process according to claim 1, wherein the soluble aromatic azo compound is present at a concentration of from 0.001 to less than 0.1 weight percent.

12. An aqueous ink composition for use in an inkjet printer comprising a silicon-based material which contacts the aqueous ink composition, comprising at least a first primary colorant and a soluble organic aromatic azo compound in a concentration lower than that of the primary colorant and sufficient to inhibit corrosion of the silicon-based material when contacted by the aqueous composition, wherein the soluble organic azo compound concentration is from about 0.001 to less than 1.0 weight percent, and wherein the primary colorant comprise a non-self-dispersed pigment.

13. The ink composition according to claim 12, wherein the soluble organic aromatic azo compound comprises a compound of formula (1):

(1)

wherein Y is a substituted or unsubstituted aromatic substituent and $S_1$ is a substituted or unsubstituted aromatic, aliphatic, cyclic, acyclic or polycyclic organic group, with the proviso that at least one of Y or $S_1$ be substituted with at least one solubilizing group.

14. The ink composition according to claim 12, wherein the primary colorant comprises a yellow, magenta, or cyan pigment.

* * * * *